United States Patent
Yamaguchi et al.

(10) Patent No.: US 11,170,075 B2
(45) Date of Patent: Nov. 9, 2021

(54) INFORMATION TERMINAL, COMMUNICATION TERMINAL, SERVER, LICENSE TRANSFER SYSTEM AND LICENSE TRANSFER METHOD

(71) Applicant: Clarion Co., Ltd., Saitama (JP)

(72) Inventors: Takashi Yamaguchi, Saitama (JP); Hiroyuki Tanaka, Saitama (JP); Haruhiko Sawajiri, Saitama (JP)

(73) Assignee: CLARION CO., LTD., Saitama (JP)

( * ) Notice: Subject to any disclaimer, the term of this patent is extended or adjusted under 35 U.S.C. 154(b) by 195 days.

(21) Appl. No.: 16/302,063

(22) PCT Filed: Apr. 3, 2017

(86) PCT No.: PCT/JP2017/013936
§ 371 (c)(1),
(2) Date: Nov. 15, 2018

(87) PCT Pub. No.: WO2017/199605
PCT Pub. Date: Nov. 23, 2017

(65) Prior Publication Data
US 2019/0155998 A1  May 23, 2019

(30) Foreign Application Priority Data
May 16, 2016 (JP) .............................. JP2016-097797

(51) Int. Cl.
*G06F 21/10* (2013.01)
*G06Q 50/10* (2012.01)
(Continued)

(52) U.S. Cl.
CPC .......... *G06F 21/105* (2013.01); *G06F 21/121* (2013.01); *G06Q 50/10* (2013.01);
(Continued)

(58) Field of Classification Search
CPC ................. G06F 21/105; G06F 21/121; G06F 2221/2135; H04L 67/12
(Continued)

(56) References Cited

U.S. PATENT DOCUMENTS 4,305,661 A * 12/1981 Pryor .................... G01B 11/00
250/223 B
7,797,367 B1 * 9/2010 Gelvin ................... H04L 67/12
709/200
(Continued)

FOREIGN PATENT DOCUMENTS

JP   2003-58657 A   2/2003
JP   2009-265884 A  11/2009
(Continued)

OTHER PUBLICATIONS

Chinese Office Action dated Apr. 1, 2021 regarding Chinese Patent Application No. 201780030547.8 corresponding to U.S. Appl. No. 16/302,063 (7 pages) with English Translation (6 pages).

*Primary Examiner* — Saleh Najjar
*Assistant Examiner* — Peiliang Pan
(74) *Attorney, Agent, or Firm* — Lewis Roca Rothgerber Christie LLP

(57) ABSTRACT

Provided is an information terminal connected to a communication terminal which is connectable to one or more other information terminals, wherein the information terminal comprises a communication unit which receives, from the communication terminal, a connection history with the other information terminals which were previously connected to the communication terminal, and a license transfer management unit which extracts an information terminal among the other information terminals that satisfies a license transfer condition based on the received connection history.

8 Claims, 12 Drawing Sheets

(51) Int. Cl.
*G06F 21/12* (2013.01)
*G06F 21/34* (2013.01)
*H04L 29/08* (2006.01)

(52) U.S. Cl.
CPC ...... *G06F 21/34* (2013.01); *G06F 2221/0768* (2013.01); *G06F 2221/0786* (2013.01); *G06F 2221/2135* (2013.01); *H04L 67/12* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 2004/0052359 | A1* | 3/2004 | Takatori | H04M 17/026 379/387.01 |
| 2005/0044361 | A1* | 2/2005 | Chang | H04L 63/123 713/167 |
| 2008/0313518 | A1* | 12/2008 | Naoe | H04L 1/16 714/748 |
| 2011/0039537 | A1* | 2/2011 | Madhavan | H04W 76/10 455/422.1 |
| 2011/0210618 | A1* | 9/2011 | Takasu | H04W 76/14 307/104 |
| 2012/0183278 | A1* | 7/2012 | Okamoto | H04L 9/0894 386/259 |
| 2013/0201316 | A1* | 8/2013 | Binder | H04L 67/12 348/77 |
| 2013/0258904 | A1* | 10/2013 | Kaufmann | H04W 4/70 370/255 |
| 2014/0059583 | A1* | 2/2014 | Matsushita | H04N 21/4622 725/25 |
| 2014/0171077 | A1* | 6/2014 | Itoh | H04W 12/08 455/435.1 |
| 2018/0053250 | A1* | 2/2018 | Fisher | G06Q 30/0275 |
| 2020/0013373 | A1* | 1/2020 | Sugaya | G06F 40/10 |
| 2020/0272708 | A1* | 8/2020 | Takabayashi | G06F 21/44 |

FOREIGN PATENT DOCUMENTS

| | | |
|---|---|---|
| JP | 2015-76822 A | 4/2015 |
| JP | 2015-169993 A | 9/2015 |
| WO | WO2013/132822 | 9/2013 |

* cited by examiner

FIG.4

| IN-VEHICLE DEVICE ID | NUMBER OF CONNECTIONS | TRANSFER STATUS |
|---|---|---|
| AAA | 30 | TRANSFERABLE |
| BBB | 1 | TRANSFERABLE |
| CCC | 2 | TRANSFERABLE |
| DDD | 5 | TRANSFER IN PROGRESS |

(a)

| IN-VEHICLE DEVICE ID | NUMBER OF CONNECTIONS | TRANSFER STATUS |
|---|---|---|
| AAA | 30 | TRANSFER IN PROGRESS |
| BBB | 1 | TRANSFERABLE |
| CCC | 2 | TRANSFERABLE |
| DDD | 5 | TRANSFER IN PROGRESS |

(b)

| IN-VEHICLE DEVICE ID | NUMBER OF CONNECTIONS | TRANSFER STATUS |
|---|---|---|
| AAA | 30 | TRANSFER COMPLETE |
| BBB | 1 | TRANSFERABLE |
| CCC | 2 | TRANSFERABLE |
| DDD | 5 | TRANSFER IN PROGRESS |

| IN-VEHICLE DEVICE ID | LICENSE | DATE OF LICENSE | EXPIRATION DATE |
|---|---|---|---|
| AAA | X APPLICATION | 2015/12/30 | 2016/12/30 |
| AAA | Y APPLICATION | 2016/1/23 | 2017/1/23 |
| AAA | Z APPLICATION | 2016/1/30 | 2018/7/30 |
| CCC | P APPLICATION | 2015/12/1 | 2016/12/1 |
| CCC | Q APPLICATION | 2016/1/1 | 2017/1/1 |
| CCC | Z APPLICATION | 2015/12/30 | 2016/12/30 |
| DDD | Y APPLICATION | 2016/1/23 | 2017/1/23 |
| DDD | Z APPLICATION | 2015/12/30 | 2016/12/30 |

(a)

342

| IN-VEHICLE DEVICE ID | LICENSE | DATE OF LICENSE | EXPIRATION DATE |
|---|---|---|---|
| BBB | X APPLICATION | 2015/12/30 | 2016/12/30 |
| BBB | Y APPLICATION | 2016/1/23 | 2017/1/23 |
| BBB | Z APPLICATION | 2016/1/30 | 2018/7/30 |
| CCC | P APPLICATION | 2015/12/1 | 2016/12/1 |
| CCC | Q APPLICATION | 2016/1/1 | 2017/1/1 |
| CCC | Z APPLICATION | 2015/12/30 | 2016/12/30 |
| DDD | Y APPLICATION | 2016/1/23 | 2017/1/23 |
| DDD | Z APPLICATION | 2015/12/30 | 2016/12/30 |

(b)

FIG.6
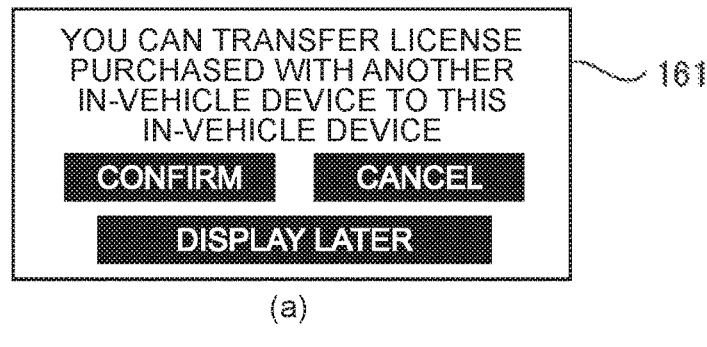
(a)
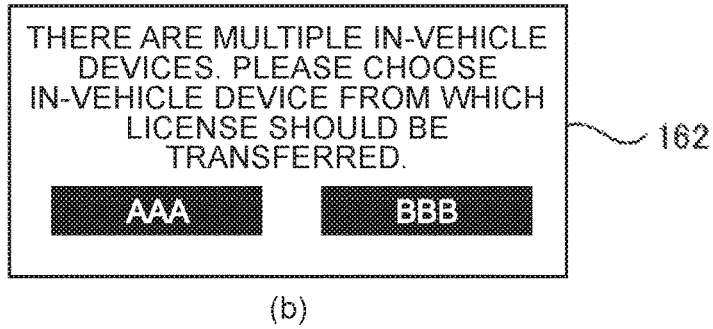
(b)
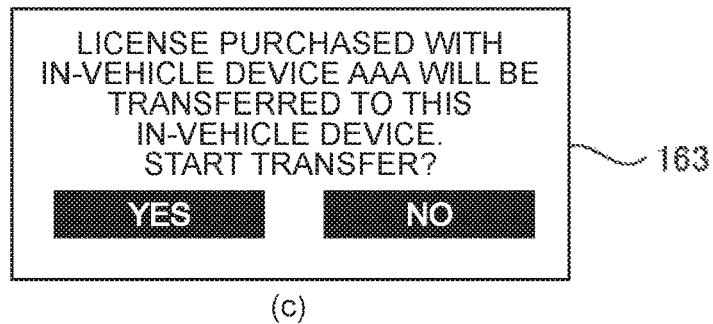
(c)
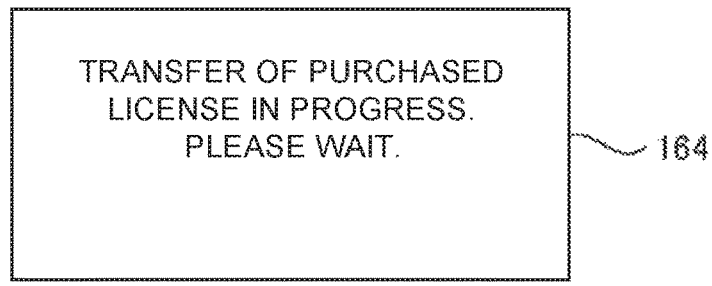
(d)
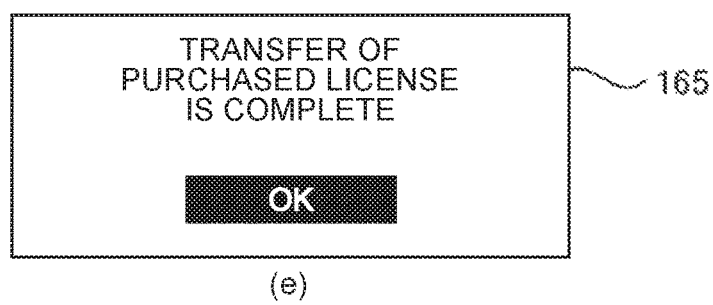
(e)

INFORMATION TERMINAL, COMMUNICATION TERMINAL, SERVER, LICENSE TRANSFER SYSTEM AND LICENSE TRANSFER METHOD

CROSS-REFERENCE TO RELATED APPLICATION(S)

This application is a U.S. National Phase Patent Application of International Application Number PCT/JP2017/013936, filed on Apr. 3, 2017, which claims priority of Japanese Patent Application Number 2016-097797, filed on May 16, 2016, the entire contents of all of which are incorporated herein by reference.

TECHNICAL FIELD

The present invention relates to an information terminal, a communication terminal, a server, a license transfer system, and a license transfer method.

BACKGROUND

In recent years, the online purchase and sale of digital contents is becoming popular. When a user purchases a digital content, for instance, a license is linked to the device that performed the purchase processing, and the user can thereby use the digital content with that device. When the user upgrades the device, the user would most likely wish to continue using the purchased content with the new device. In the foregoing case, there are several schemes have been proposed for transferring the license to the new device.

PTL 1 discloses a license management server comprising individual storage means for storing license information, which is used for identifying the contents of the right of use of each user, in a storage area associated with each terminal device or each user, temporary storage means for temporarily storing the license information, key information generation means which, upon receiving an instruction from a first terminal device or a first user to the effect of requesting the transfer of the right of use, generates key information corresponding to the license information pertaining to the transfer request and sends the generated key information to the first terminal device or the first user, first rights transfer means for transferring the license information pertaining to the transfer request from the individual storage means to the temporary storage means, and second rights transfer means which, upon receiving the key information from a second terminal device or a second user, transfers the license information associated with the key information from the temporary storage means to a storage area of the individual storage means associated with the second terminal device or the second user.

CITATION LIST

Patent Literature

[PTL 1] Japanese Unexamined Patent Application Publication No, 2003-58657

SUMMARY

With the invention described in PTL 1, a license cannot be transferred easily when the device to which the license has been linked is inoperable.

According to the first mode of the present invention, provided is an information terminal connected to a communication terminal which is connectable to one or more other information terminals, comprising: a communication unit which receives, from the communication terminal, a connection history with the other information terminals which were previously connected to the communication terminal; and a license transfer management unit which extracts an information terminal among the other information terminals that satisfies a license transfer condition based on the received connection history.

According to the second mode of the present invention, provided is a communication terminal which is connectable to each of a plurality of information terminals, comprising: a connection history storage unit which stores a connection history with the plurality of information terminals; and an in-vehicle device connection history management unit which reads the connection history from the connection history storage unit, and sends the connection history to a connected information terminal among the plurality of information terminals, wherein the in-vehicle device connection history management unit stores the connection history with the connected information terminal in the connection history storage unit based on a command from the connected information terminal.

According to the third mode of the present invention, provided is a server connected to a communication terminal which is connectable to each of a plurality of information terminals, comprising: a connection history storage unit which stores a connection history of the plurality of information terminals and the communication terminal; and an in-vehicle device connection history management unit which reads the connection history from the connection history storage unit, and sends the connection history to the communication terminal, wherein the in-vehicle device connection history management unit stores the connection history of the communication terminal and the information terminal in the connection history storage unit based on a command from the communication terminal.

According to the fourth mode of the present invention, provided is a license transfer system configured from an information terminal, a communication terminal, and a server, wherein the information terminal is connected to a communication terminal which is connectable to one or more other information terminals, and comprises: an information terminal communication unit which receives, from the communication terminal, a connection history with the other information terminals which were previously connected to the communication terminal; and a license transfer management unit which extracts an information terminal among the other information terminals that satisfies a license transfer condition based on the received connection history, wherein the information terminal communication unit sends, to the server, a license transfer command for transferring a license from an information terminal which satisfies the license transfer condition to the corresponding information terminal, wherein the communication terminal comprises: a connection history storage unit which stores a connection history with the plurality of information terminals; and an in-vehicle device connection history management unit which reads the connection history from the connection history storage unit, and sends the connection history to a connected information terminal among the plurality of information terminals, wherein the in-vehicle device connection history management unit stores the connection history with the connected information terminal in the connection history storage unit based on a command from the connected information terminal, and wherein the server comprises: a server storage unit which stores a license table indicating a relation between the information terminal and a software license; and a license management unit which rewrites the license table based on the license transfer command from the information terminal.

According to the fifth mode of the present invention, provided is a license transfer method executed in an information terminal, a communication terminal, and a server, wherein the information terminal: is connected to a communication terminal which is connectable to one or more other information terminals; receives, from the communication terminal, a connection history with the other information terminals which were previously connected to the communication terminal; extracts an information terminal among the other information terminals that satisfies a license transfer condition based on the received connection history; and sends, to the server, a license transfer command for transferring a license from an information terminal which satisfies the license transfer condition to the corresponding information terminal, wherein the communication terminal comprises a connection history storage unit which stores a connection history with the plurality of information terminals, wherein the communication terminal: reads the connection history from the connection history storage unit, and sends the connection history to a connected information terminal among the plurality of information terminals; and stores the connection history with the connected information terminal in the connection history storage unit based on a command from the connected information terminal, and wherein the server comprises a server storage unit which stores a license table indicating a relation between the information terminal and a software license; and wherein the server rewrites the license table based on the license transfer command from the information terminal.

According to the present invention, a license can be transferred easily even when the device to which the license has been linked is inoperable.

BRIEF DESCRIPTION OF DRAWINGS

FIG. 4 is a diagram showing an example of the connection history.

FIG. 5 is a diagram showing an example of the license table.

FIG. 6 is a diagram showing a screen display example to be displayed on the display unit during license transfer processing.

DESCRIPTION OF EMBODIMENTS

First Embodiment

The first embodiment of an in-vehicle device, which is an information terminal, is now explained with reference to FIG. 1 to FIG. 9.

Figure 1:
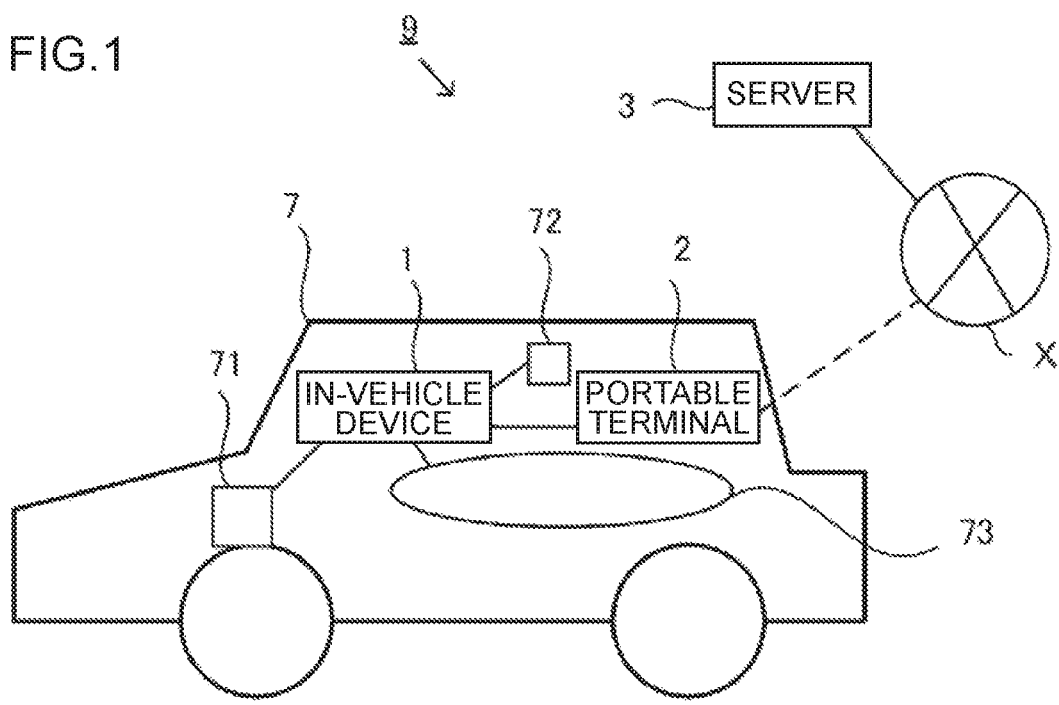
FIG. 1 is a diagram showing an overview of the license transfer system.

FIG. 1 is a diagram showing an overview of a license transfer system 9. The license transfer system 9 is configured from an in-vehicle device 1, a portable terminal 2, and a server 3. The in-vehicle device 1 is installed in a vehicle 7.

The vehicle 7 comprises a rotary encoder 71, a GPS receiver 72, and a CAN network 73. The rotary encoder 71 outputs, to the in-vehicle device 1, a vehicle speed pulse signal each time the wheels mounted on the vehicle rotate at a predetermined angle. The GPS receiver 72 receives signals from a plurality of satellites configuring a satellite navigation system, and calculates the position, or latitude and longitude, of the GPS receiver 72 pursuant to an arithmetic operation based on the received signals. The CAN network 73 is one type of in-vehicle network, and is a network which uses CAN (Controller Area Network) as the communication protocol. A plurality of devices compatible with CAN are connected to the CAN network 73.

The in-vehicle device 1 is connected to the portable terminal 2, the rotary encoder 71, the GPS receiver 72, and the CAN network 73. The portable terminal 2 is installed in the same vehicle 7 as the in-vehicle device 1, and connected to the in-vehicle device 1. Furthermore, the portable terminal 2 is also connected to the server 3 via a network X. The in-vehicle device 1 is communicable with the server 3 via the portable terminal 2.

Figure 2:
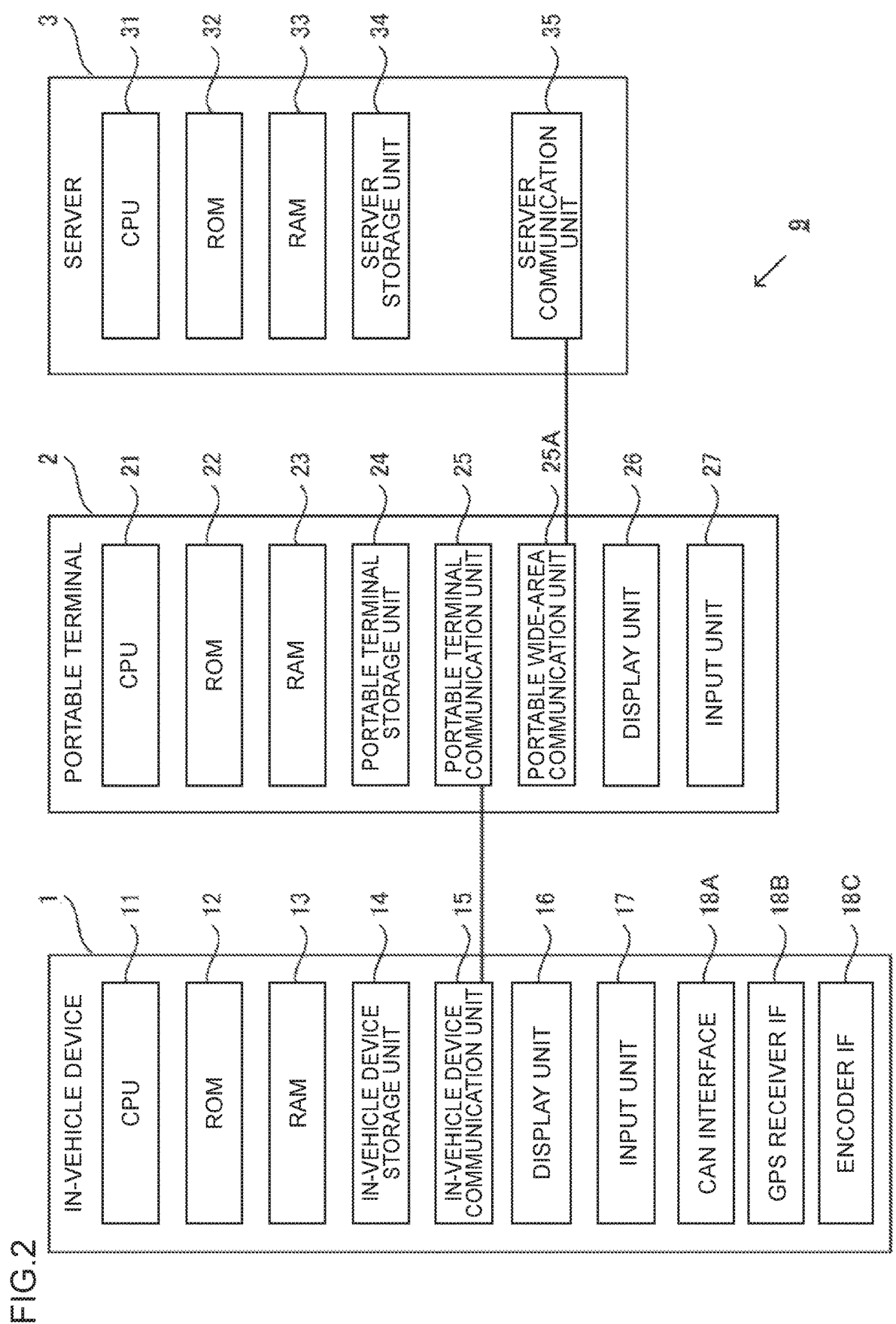
FIG. 2 is a diagram showing a hardware configuration of the license transfer system.

FIG. 2 is a diagram showing a hardware configuration of the license transfer system 9.

The in-vehicle device 1 comprises a CPU 11, a ROM 12, a RAM 13, an in-vehicle device storage unit 14, an in-vehicle device communication unit 15, a display unit 16, an input unit 17, a CAN interface 18A, a GPS receiver interface 18B, and an encoder interface 18C.

The CPU 11 realizes the plurality of functions described later by reading the programs stored in the ROM 12 into the RAM 13 and executing such programs. These functions will be explained later as functional blocks. Moreover, the CPU 11 additionally reads the applications stored in the in-vehicle device storage unit 14 into the RAM 13 and executes such applications. The ROM 12 stores programs and an in-vehicle device D which is an identifier that is unique to each in-vehicle device 1.

The in-vehicle device storage unit 14 is configured from a flash memory, or an HDD (hard disk drive). The in-vehicle device storage unit 14 stores a plurality of applications to be executed in in-vehicle device 1, license information of the applications, and position information of a registered location which is registered in advance. The applications and the license information are acquired from the server 3, and the registered location is input by the user. The registered location is, for instance, the location of the user's home.

The in-vehicle device communication unit 15 is connected to the portable terminal 2, and communicates with the portable terminal 2. The in-vehicle device communication unit 15 performs wired communication using a connection cable, or performs wireless communication using radio waves. The in-vehicle device communication unit 15 outputs the connection or non-connection with the portable terminal 2 to the CPU 11.

The display unit 16 is, for example, a liquid crystal display, and provides video information to the user based on an operating command of the CPU 11. The input unit 17 is, for example, one or more buttons, and conveys the user's input operation to the CPU 11. However, the display unit 16 and the input unit 17 may also be configured integrally as a liquid crystal touch panel. The user uses the input unit 17 to register a specific location; for instance, the location of the user's home, in the in-vehicle device storage unit 14. This position information may be used, for example, as the navigation destination information.

The CAN interface 18A is an interface which connects the in-vehicle device 1 to the CAN network 73 of the vehicle 7. The in-vehicle device 1 communicates with the other devices connected to the CAN network 73 via the CAN interface 18A.

The GPS receiver interface 18B is an interface which connects the GPS receiver 72 and the in-vehicle device 1 installed in the vehicle 7. The in-vehicle device 1 acquires information of the current position from the GPS receiver 72 via the GPS receiver interface 18B.

The encoder interface 18C is an interface which connects the rotary encoder 71 and the in-vehicle device 1 installed in the vehicle 7. Because the rotary encoder 71 outputs one pulse each time the vehicle 7 travels a certain distance, the in-vehicle device 1 can calculate the travel distance of the vehicle 7 based on the output of the rotary encoder 71.

The portable terminal 2 comprises a CPU 21, a ROM 22, a RAM 23, a portable terminal storage unit 24, a portable terminal communication unit 25, a portable wide-area communication unit 25A, a display unit 26, and an input unit 27. The CPU 21 realizes the plurality of functions described later by reading the programs stored in the ROM 22 into the RAM 23 and executing such programs. These functions will be explained later as functional blocks. The portable terminal storage unit 24 is a flash memory. The portable terminal storage unit 24 stores a connection history described later. The portable terminal communication unit 25 communicates with the in-vehicle device 1 via wired communication or wireless communication. The portable wide-area communication unit 25A communicates with the server 3 via wireless communication. The portable wide-area communication unit 25A may use a mobile telephone network, or use satellite communication. The display unit 26 is, for example, a liquid crystal display, and provides video information to the user based on an operating command of the CPU 21. The input unit 27 is, for example, one or more buttons, and conveys the user's input operation to the CPU 21. However, the display unit 26 and the input unit 27 may also be configured integrally as a liquid crystal touch panel.

The server 3 comprises a CPU 31, a ROM 32, a RAM 33, a server storage unit 34, and a server communication unit 35. The CPU 31 realizes the plurality of functions described later by reading the programs stored in the ROM 32 into the RAM 33 and executing such programs. These functions will be explained later as functional blocks. The server storage unit 34 is an HDD, or a flash memory. The server storage unit 34 stores an application database, and a license table described later. The server communication unit 35 communicates with the portable terminal 2 via the network X shown in FIG. 1.

Figure 3:
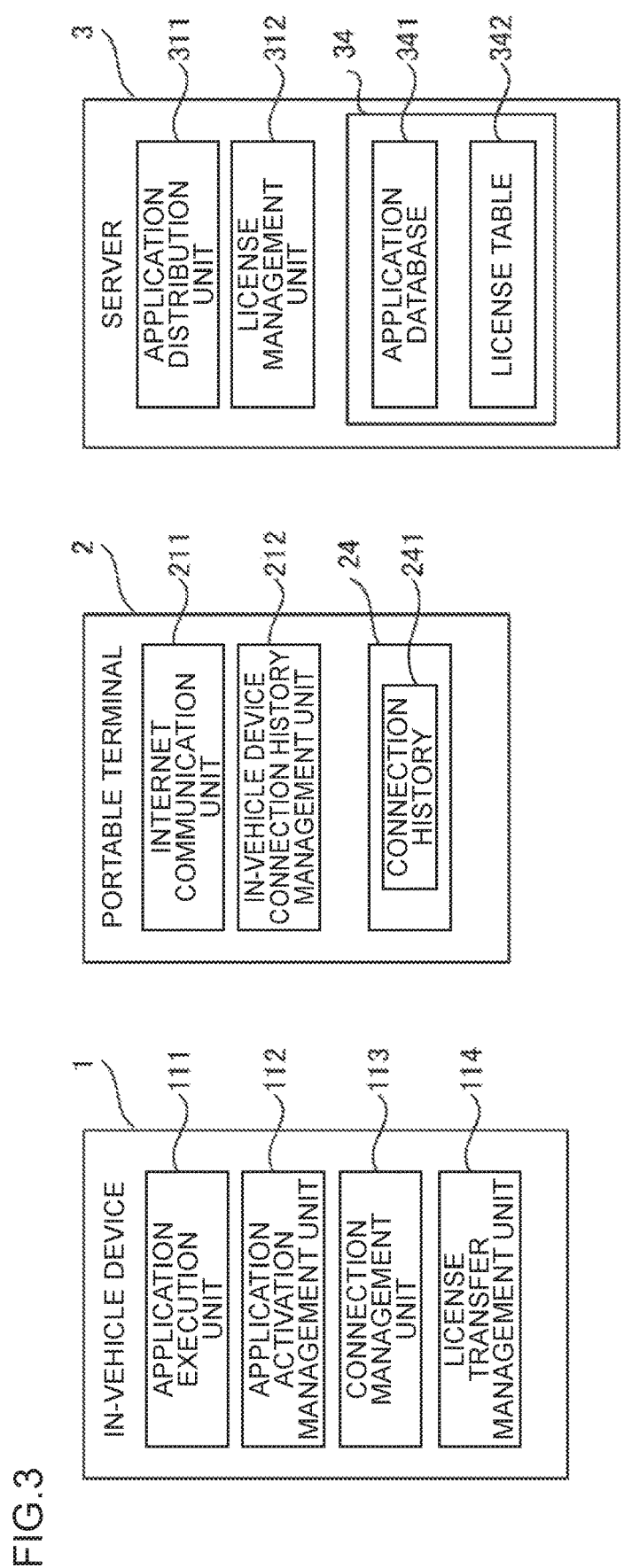
FIG. 3 is a functional block diagram of the license transfer system.

FIG. 3 is a functional block diagram of the license transfer system 9.

The in-vehicle device 1 comprises, as its logical configuration, an application execution unit 111, an application activation management unit 112, a connection management unit 113, and a license transfer management unit 114. These functional blocks are realized by the CPU 11 executing the programs stored in the ROM 12. The main operation of these functional blocks is as follows.

The application execution unit 111 executes applications based on a command of the application activation management unit 112. However, as described later, certain applications cannot be executed without a license. The license is linked to the in-vehicle device 1, and is managed in the license table of the server 3. The application activation management unit 112 causes the application execution unit 111 to execute an application based on the user's input into the input unit 17. Moreover, the application activation management unit 112 requests the server 3 to provide license information each time an application is activated, and thereby acquires the license information. The connection management unit 113 sends a connection history recording command to the connected portable terminal 2 under predetermined conditions. The license transfer management unit 114 acquires a connection history from the connected portable terminal 2, and transfers the license by interacting with the user through the display unit 16 and the input unit 17. However, the foregoing license is not limited to licenses which are granted in consideration for the payment of monies, and also includes licenses that are granted free of charge; for instance, licenses that are granted based on user registration and trial version licenses.

The portable terminal 2 comprises, as its logical configuration, an internet communication unit 211, and an in-vehicle device connection history management unit 212. These functional blocks are realized by the CPU 21 executing the programs stored in the ROM 22. Moreover, the portable terminal storage unit 24 stores the connection history 241 described later. The internet communication unit 211 provides, to the in-vehicle device 1, a communication path to the server 3 by using the portable terminal communication unit 25 and the portable wide-area communication unit 25A. In other words, the in-vehicle device 1 can send and receive data to and from the server 3 by using the internet communication unit 211. The in-vehicle device connection history management unit 212 records information in the connection history 241 and reads information from the connection history 241 according to a request from the in-vehicle device 1. The connection history 241 is a record of the number of connections and transfer status of each in-vehicle device.

The server 3 comprises, as its logical configuration, an application distribution unit 311, and a license management unit 312. These functional blocks are realized by the CPU 31 executing the programs stored in the ROM 32. Moreover, the server storage unit 34 stores an application database 341 which stores a plurality of applications, and a license table 342 described later. The license table 342 is a record of license information of each in-vehicle device. The license management unit 312 rewrites the license table 342 based on a license transfer command from the in-vehicle device 1.

(Connection History)

The connection history 241 is, for example, a plurality of records that associate an in-vehicle device ID which identifies the in-vehicle device 1, number of connections, and a transfer status as status information related to the transfer. The connection history 241 is read and written by the in-vehicle device connection history management unit 212.

FIG. 4 is a diagram showing an example of the connection history 241. In the example shown in FIG. 4(a), four in-vehicle devices 1 respectively having an in-vehicle device ID of AAA, BBB, CCC, and DDD are recorded, and their respective number of connections is 30 connections, 1 connection, 2 connections, and 5 connections. The number of connections starts from zero, and is incremented by one each time the in-vehicle device 1 is connected. The initial value of the transfer status is "transferable", and the transfer status changes to "transfer in progress" and then to "transfer complete" as the transfer processing advances. In the example shown in FIG. 4(a) to FIG. 4(c), the transfer processing of the in-vehicle device ID "AAA" is advancing, and the transfer status changes from "transferable" to "transfer in progress", and then to "transfer complete".

(License Table)

The license table 342 is, for example, a plurality of records that associate an in-vehicle device ID which identifies the in-vehicle device 1, name of application, date of license, and expiration date.

FIG. 5 is a diagram showing an example of the license table 342. In the license table 342 shown in FIG. 5(a), the licenses of three in-vehicle devices 1 respectively having an in-vehicle device ID of AAA, CCC, and DDD are recorded. FIG. 5(b) is a diagram showing an example where the licenses of the in-vehicle device ID "AAA" have been transferred to the in-vehicle device ID "BBB" based on the processing described later. Upon comparing FIG. 5(a) and FIG. 5(b), the in-vehicle device ID of "AAA" in FIG. 5(a) has been rewritten to "BBB". In other words, a "license transfer" is the rewriting of the in-vehicle device ID in the license table 342.

(Connection Management Unit)

The connection management unit 113 outputs a connection history recording command to the portable terminal 2 when all of the following five conditions are satisfied. The first condition is that the in-vehicle device 1 is connected to the portable terminal 2. The connection management unit 113 determines whether the in-vehicle device 1 is connected to the portable terminal 2 based on an output of the in-vehicle device communication unit 15. The second condition is that the in-vehicle device 1 is connected to the CAN network 73 of the vehicle 7. The connection management unit 113 determines whether the in-vehicle device 1 is connected to CAN network 73 of the vehicle 7 based on an output of the CAN interface 18A. The third condition is that the current position is near the registered location; for instance, within 1 km from the registered location. Position information of the registered location is input by the user in advance and stored in the in-vehicle device storage unit 14. The current position of the vehicle 7 can be acquired from the GPS receiver 72 installed in the vehicle 7 via the GPS receiver interface 18B. The fourth condition is that the vehicle 7 has travelled a predetermined distance or more; for instance, 10 m or more. Information regarding the travel distance of the vehicle 7 can be acquired by receiving an output of the rotary encoder 71 via the encoder interface 18C. For example, because the rotary encoder 71 outputs a pulse each time the tires rotate at a predetermined angle; that is, each time the vehicle 7 travels a predetermined distance, the fourth condition can be determined by counting the number of pulses input into the encoder interface 18C. The fifth condition is that the travel speed of the vehicle 7 is a predetermined speed; for instance, 20 km per hour, or faster. The travel speed of the vehicle 7 can be calculated based on the number of pulses of the rotary encoder 71 that is input into the encoder interface 18C per unit time. Otherwise, the speed of the vehicle 7 may also be calculated from the relation of the position of the vehicle acquired via the GPS receiver interface 18B, and time.

When the connection management unit 113 determines that all of these five conditions have been satisfied, the connection management unit 113 outputs a connection history recording command to the portable terminal 2. However, in order to prevent a connection history from being recorded multiple times in one day, if the connection management unit 113 has already output a connection history recording command during the current day, it does not output a connection history recording command. This determination can be made, for instance, by recording the date on which the connection history recording command has been output in the in-vehicle device storage unit 14, and determining whether the recorded date and the current date coincide. The connection history recording command at least includes the in-vehicle device ID of the corresponding in-vehicle device 1.

(License Transfer Management Unit)

The license transfer management unit 114 sends a connection history acquisition command to the portable terminal 2, and acquires the connection history 241. The license transfer management unit 114 subsequently extracts the in-vehicle device 1 which satisfies the transfer condition from the acquired connection history 241. The transfer condition is, for example, that the number of connections is a predetermined number of times (for instance, 5 times) or more, and that the transfer status is not "transfer complete". When there are a plurality of in-vehicle devices 2 that satisfy the transfer condition, the display unit 16 is used to make an inquiry to the user, and the user is requested to reply using the input unit 17. The in-vehicle device 1 in cases when only one in-vehicle device 1 satisfies the transfer condition, or the in-vehicle device 1 selected by the user in cases where there are a plurality of in-vehicle devices 1 that satisfy the transfer condition, is hereinafter referred to as the "transfer source in-vehicle device".

(Screen Display of License Transfer Processing)

FIG. 6(a) to FIG. 6(e) are diagrams showing a screen display example to be displayed on the display unit 16 during license transfer processing. When the user operates the input unit 17 of the in-vehicle device 1 and starts the license transfer processing, the license transfer management unit 114 starts the license transfer processing. The license transfer management unit 114 determines whether there is at least one in-vehicle device capable of license transfer, and, when it is determined that there is at least one such in-vehicle device, the transfer notification screen 161 shown in FIG. 6(a) is displayed on the display unit 16. Here, when the user selects "Confirm", the displayed screen is switched to the next screen, and, when the user selects "Cancel" or "Display later", the transfer processing is ended. Note that, when "Display later" is selected, the transfer notification screen 161 is redisplayed later, but when "Cancel" is selected, the transfer notification screen 161 is not redisplayed.

When the user selects "Confirm" on the transfer notification screen 161 and there a plurality of (for instance, two) in-vehicle devices capable of license transfer, the transfer source in-vehicle device selection screen 162 shown in FIG. 6(b) is displayed on the display unit 16. The transfer source in-vehicle device selection screen 162 displays the ID of a plurality of in-vehicle devices 1 capable of license transfer.

When the user selects "Confirm" on the transfer notification screen 161 and there is only one in-vehicle device capable of license transfer, or the user selects one in-vehicle device ID on the transfer source in-vehicle device selection screen 162, the transfer execution confirmation screen 163 shown in FIG. 6(c) is displayed on the display unit 16. When the user selects "Yes", which means to execute the transfer, on the transfer execution confirmation screen 163, the transfer of the license is executed by the license transfer management unit 114, and, after the transfer in progress screen 164 shown in FIG. 6(d) is displayed, the transfer completion notice screen 165 shown in FIG. 6(e) is displayed.

(Flowchart of Application Execution Unit)

Figure 7:
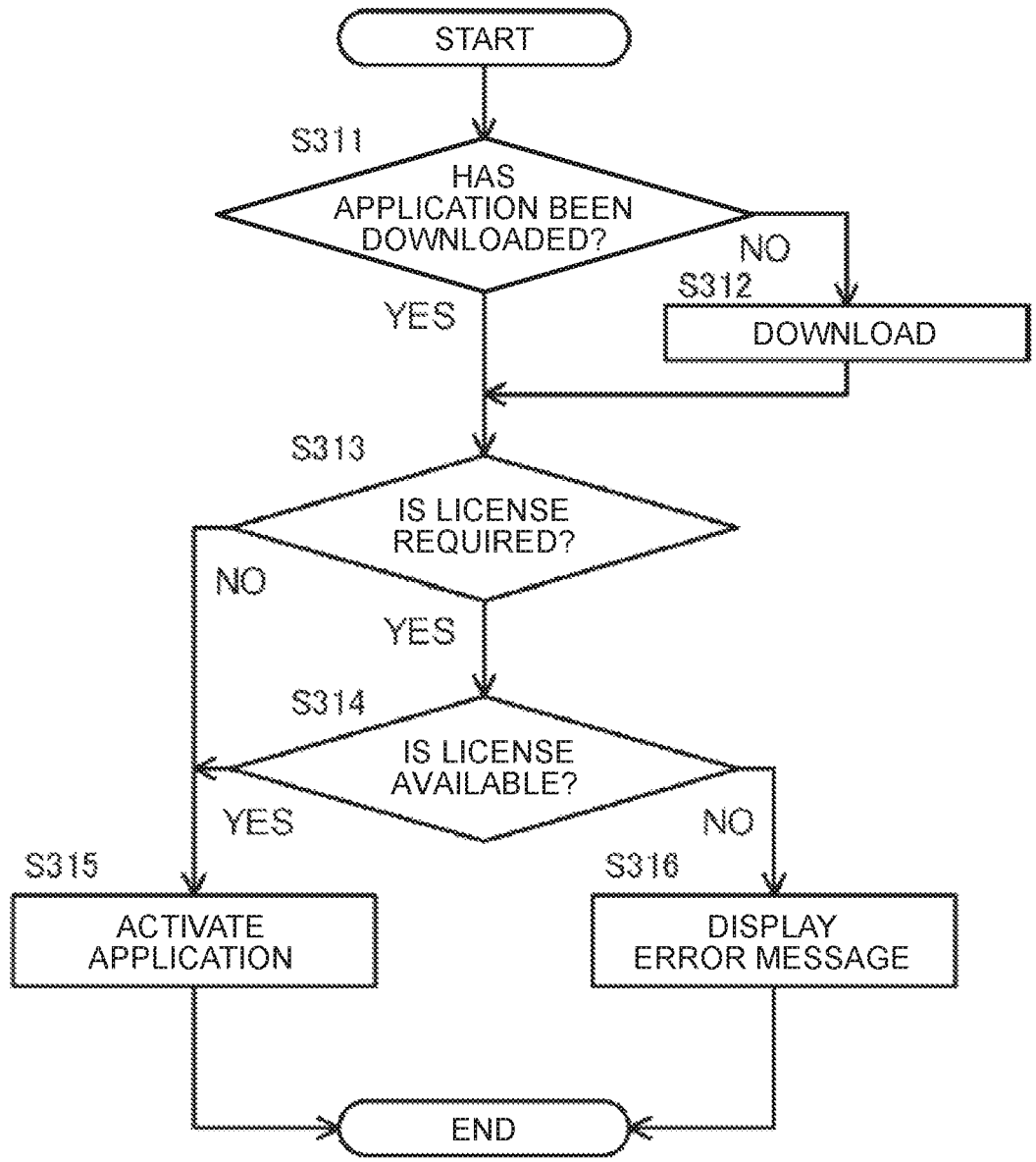
FIG. 7 is a flowchart showing an operation of the application execution unit.

FIG. 7 is a flowchart showing an operation of the application execution unit 111. When the application execution unit 111 receives an application activation command from the application activation management unit 112, the application execution unit 111 executes the program in which the operation shown in FIG. 7 is performed. In the ensuing explanation, the application as the target of the activation command is hereinafter referred to as the "application to be activated".

In step S311, the application execution unit 111 determines whether the application to be activated has been downloaded; that is, whether the application to be activated is stored in the in-vehicle device storage unit 14. When it is determined that the application to be activated has been downloaded, the application execution unit 111 proceeds to step S313, and, when it is determined that the application to be activated has not been downloaded, the application execution unit 111 proceeds to step S312, downloads the application to be active from the server 3, and then proceeds to step S313.

In step S313, the application execution unit 111 determines whether the application to be activated requires a license. Whether a license is required is recorded, for instance, in each application. When it is determined that a license is required, the application execution unit 111 proceeds to step S314, and, when it is determined that a license is not required, the application execution unit 111 proceeds to step S315.

In step S314, the application execution unit 111 refers to the license information stored in the in-vehicle device storage unit 14, and determines whether the license of the application to be activated is available. When it is determined that the license of the application to be activated is available, the application execution unit 111 proceeds to step S315, and, when it is determined that the license of the application to be activated is not available, the application execution unit 111 proceeds to step S316.

In step S315, the application execution unit 111 reads the application to be activated into the RAM 13 and executes the application, and then ends the flowchart of FIG. 7. In step S316, because the license is not available, the application execution unit 111 displays an error to the effect that the application cannot be executed on the display unit 16, and then ends the flowchart of FIG. 7.

(Flowchart of Connection Management Unit)

Figure 8:
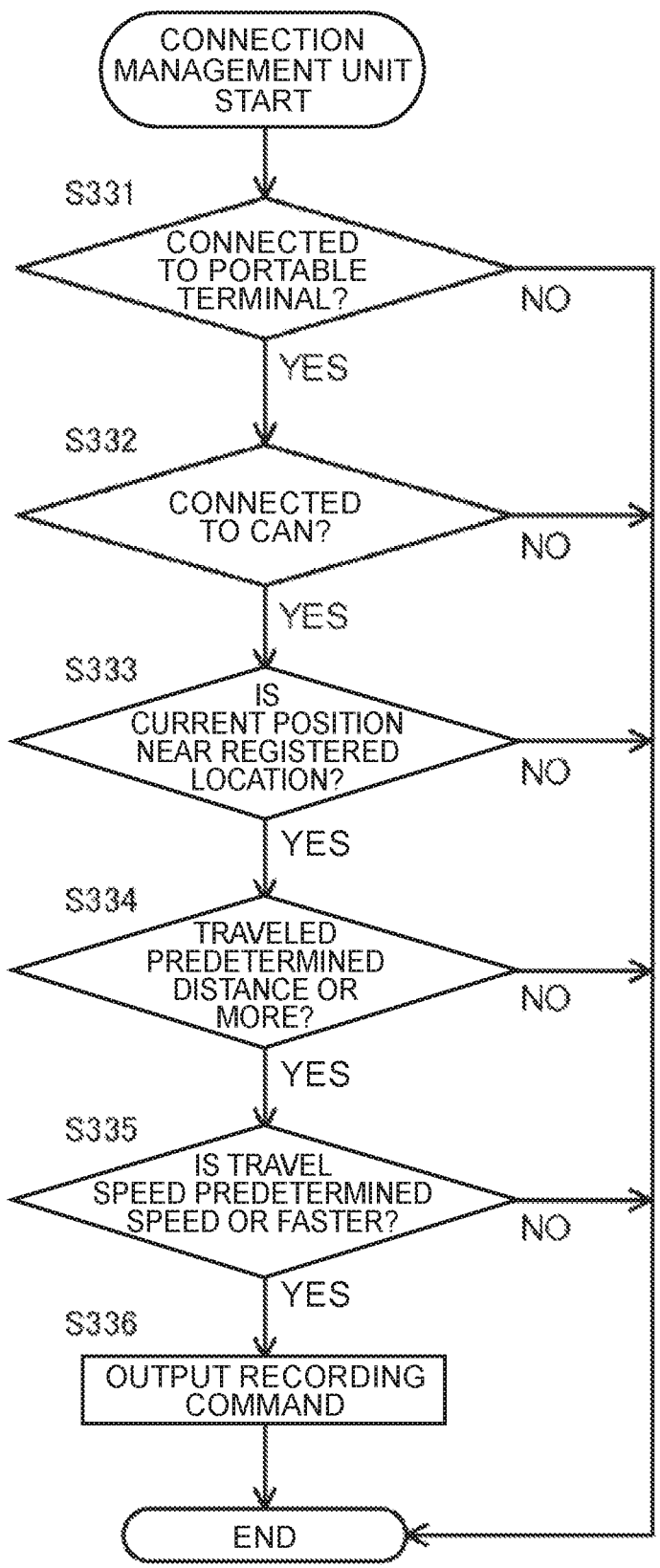
FIG. 8 is a flowchart showing an operation of the connection management unit.

FIG. 8 is a flowchart showing an operation of the connection management unit 113. The connection management unit 113 executes the program in which the operation shown in FIG. 8 is performed when the in-vehicle device 1 is activated, or after each lapse of a predetermined time (for instance, 2 hours) from the activation of the in-vehicle device 1.

In step S331, the connection management unit 113 determines whether the in-vehicle device 1 is connected to the portable terminal 2 based on an output of the in-vehicle device communication unit 15, proceeds to step S332 when it is determined that the in-vehicle device 1 is connected to the portable terminal 2, and ends the flowchart of FIG. 8 when it is determined that the in-vehicle device 1 is not connected to the portable terminal 2.

In step S332, the connection management unit 113 determines whether the in-vehicle device 1 is connected to the CAN network 73 based on an output of the CAN interface 18A, proceeds to step S333 when it is determined that the in-vehicle device 1 is connected to the CAN network 73, and ends the flowchart of FIG. 8 when it is determined that the in-vehicle device 1 is not connected to the CAN network 73.

In step S333, the connection management unit 113 determines whether the current position of the in-vehicle device 1 is within a predetermined distance from the registered location based on an output of the GPS receiver 72 obtained via the GPS receiver interface 18B and the position information of the registered location stored in the in-vehicle device storage unit 14. The connection management unit 113 proceeds to step S334 when it is determined that the current position of the in-vehicle device 1 is within a predetermined distance, and ends the flowchart of FIG. 8 when it is determined that the current position of the in-vehicle device 1 is not within a predetermined distance.

In step S334, the connection management unit 113 determines whether the vehicle 7 has traveled a predetermined distance or more based on an output of the rotary encoder 71 obtained via the encoder interface 18C. The connection management unit 113 proceeds to step S335 when it is determined that the vehicle 7 has traveled a predetermined distance or more, and ends the flowchart of FIG. 8 when it is determined that the vehicle 7 has not traveled a predetermined distance or more. However, the connection management unit 113 may also remain in step S334 until the vehicle 7 travels a predetermined distance or more.

In step S335, the connection management unit 113 determines whether the vehicle speed of the vehicle 7 is a predetermined speed or faster based on an output of the rotary encoder 71 obtained via the encoder interface 18C. The connection management unit 113 proceeds to step S336 when it is determined that the vehicle speed is a predetermined speed or faster, and ends the flowchart of FIG. 8 when it is determined that the vehicle speed is not a predetermined speed or faster. However, the connection management unit 113 may also remain in step S335 until the vehicle speed becomes a predetermined speed or faster.

In step S336, the connection management unit 113 outputs a connection history recording command to the in-vehicle device connection history management unit 212 via the in-vehicle device communication unit 15. However, as described above, if the connection management unit 113 has already output a connection history recording command during the current day, it does not output a connection history recording command. This determination can be made, for instance, by recording the date on which the connection history recording command has been output in the in-vehicle device storage unit 14, and determining whether the recorded date and the current date coincide. The flowchart of FIG. 8 is thereby ended.

(Flowchart of License Transfer Management Unit)

Figure 9:
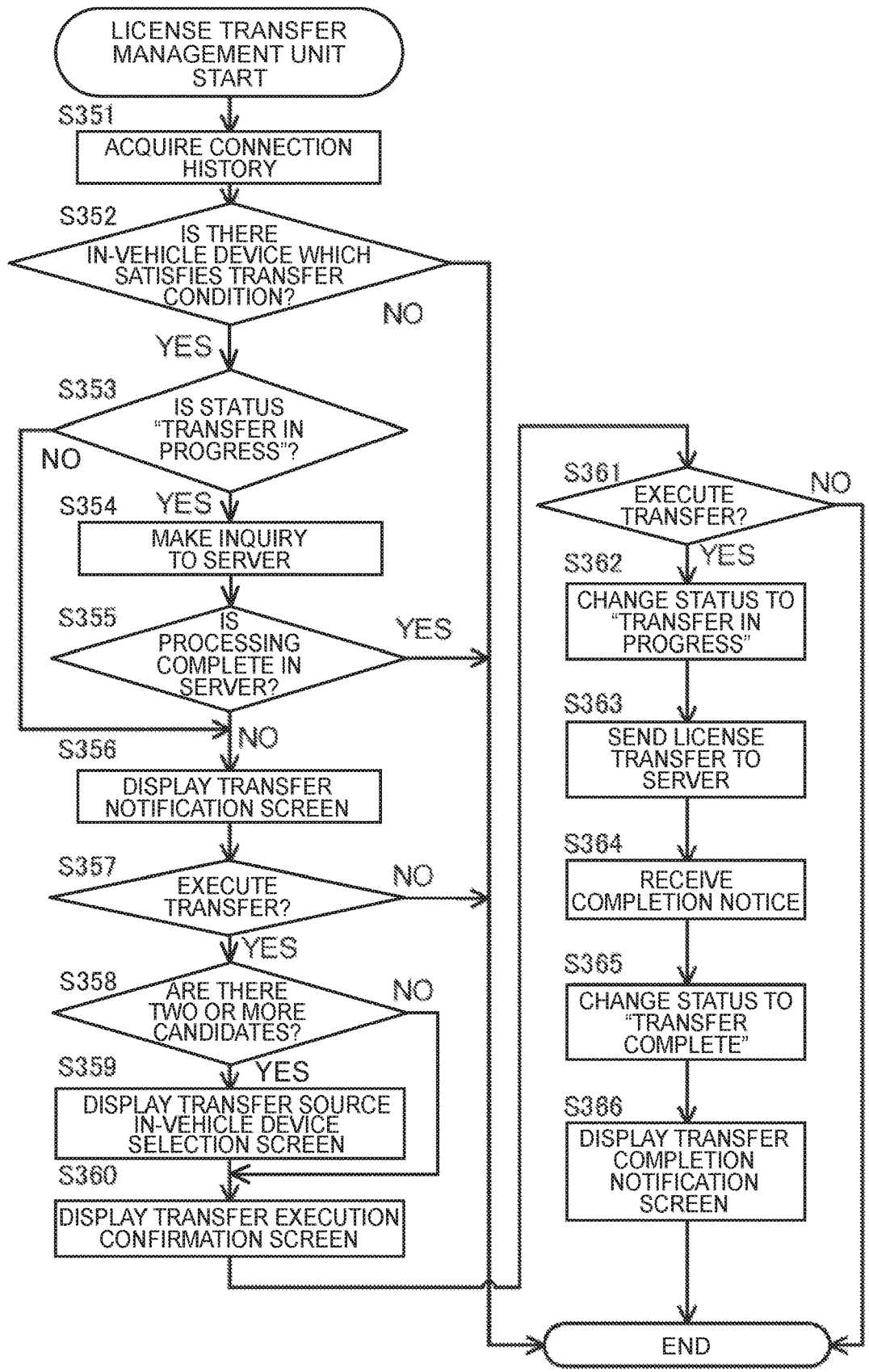
FIG. 9 is a flowchart showing an operation of the license transfer management unit.

FIG. 9 is a flowchart showing the license transfer processing performed by the license transfer management unit 114. When the user uses the input unit 17 and sends a license transfer processing command to the in-vehicle device 1; for instance, by selecting "license transfer" on the menu screen, the license transfer management unit 114 executes the program in which the operation shown in FIG. 9 is performed.

In step S351, the license transfer management unit 114 requests the connection history 241 by sending a connection history acquisition command to the in-vehicle device connection history management unit 212 of the portable terminal 2 connected to the in-vehicle device 1, and acquires the connection history 241 from the in-vehicle device connection history management unit 212. In subsequent step S352, the license transfer management unit 114 refers to the connection history 241 acquired in step S351, and determines whether there is another in-vehicle device that satisfies the transfer condition. For example, the license transfer management unit 114 determines whether there is another in-vehicle device other than the in-vehicle device 1 under the license transfer processing in the license transfer management unit 114 in which the number of connections is 5 connections or more and the status is not "transfer complete". The license transfer management unit 114 proceeds to step S353 when it is determined that there is another in-vehicle device that satisfies the condition, and ends the flowchart of FIG. 9 when it is determined that there no other in-vehicle device that satisfies the condition.

In step S353, the license transfer management unit 114 determines whether the status of the other in-vehicle device that satisfies the condition is "transfer in progress". The license transfer management unit 114 proceeds to step S354 when it is determined that the status is "transfer in progress", and proceeds to step S356 when it is determined that the status is not "transfer in progress"; that is, when it is determined that the status is "transferable".

In step S354, the license transfer management unit 114 sends an inquiry to the server 3 on whether the transfer processing is complete, and receives a response. In subsequent step S355, the license transfer management unit 114 determines whether the response is "processing complete". The license transfer management unit 114 ends the flowchart of FIG. 9 when it is determined that the response is "processing complete", and proceeds to step S356 when it is determined that the response is not "processing complete".

In step S356, the license transfer management unit 114 displays, on the display unit 16, a display screen for confirming the user's intention of license transfer. This display screen is, for example, the screen shown with reference numeral 161 in FIG. 6(a) described above. In subsequent step S357, the license transfer management unit 114 determines whether the user's input is for executing the transfer. The license transfer management unit 114 proceeds to step S358 when it is determined that the user's input is for executing the transfer; for instance, when it is determined that the user selected "Confirm", and ends the flowchart of FIG. 9 when it is determined that the user's input is not for executing the transfer; for instance, when it is determined that the user selected "Cancel" or "Display later".

In step S358, the license transfer management unit 114 determines whether there are two or more other in-vehicle devices that satisfy the condition, proceeds to step S359 when it is determined that there are two or more other in-vehicle devices that satisfy the condition, and, when it is determined that there is only one in-vehicle device that satisfies the condition, stores that in-vehicle device as the transfer source in-vehicle device, and then proceeds to step S360. In step S359, the license transfer management unit 114 displays, on the display unit 16, the plurality of other in-vehicle devices that satisfy the condition and a display screen for selecting one among such plurality of other in-vehicle devices. This display screen is, for example, the screen shown with reference numeral 162 in FIG. 6(b) described above. Subsequently, the license transfer management unit 114 stores the in-vehicle device selected by the user as the transfer source in-vehicle device, and then proceeds to step S361.

In step S360, the license transfer management unit 114 displays, on the display unit 16, a display screen which shows the transfer source in-vehicle device and used for confirming the execution of the transfer processing. This display screen is, for example, the screen shown with reference numeral 163 in FIG. 6(c) described above. In subsequent step S361, the license transfer management unit 114 determines whether the user's input is for executing the transfer. The license transfer management unit 114 proceeds to step S362 when it is determined that the user's input is for executing the transfer; for instance, when it is determined that the user selected "Yes", and ends the flowchart of FIG. 9 when it is determined that the user's input is not for executing the transfer; for instance, when it is determined that the user selected "No".

In step S362, the license transfer management unit 114 causes the in-vehicle device connection history management unit 212 to change the status of the transfer source in-vehicle device to "transfer in progress", Moreover, the license transfer management unit 114 displays, on the display unit 16, a display screen showing that the license transfer is in progress. This display screen is, for example, the screen shown with reference numeral 164 in FIG. 6(d) described above. In subsequent step S363, the license transfer management unit 114 sends a license transfer command to the server 3. In subsequent step S364, the license transfer management unit 114 receives a license transfer completion notice from the server 3. In subsequent step 3365, the license transfer management unit 114 causes the in-vehicle device connection history management unit 212 to change the status of the transfer source in-vehicle device to "transfer complete". In subsequent step S366, the license transfer management unit 114 displays, on the display unit 16, a screen of the transfer completion notice indicating that the license transfer is complete. This display screen is, for example, the screen shown with reference numeral 165 in FIG. 6(e) described above. The flowchart of FIG. 9 is thereby ended.

According to the first embodiment described above, the following effects are yielded.

(1) An information terminal (in-vehicle device 1) is connected to a communication terminal (portable terminal 2) which is connectable to one or more other information terminals. The in-vehicle device 1 comprises an in-vehicle device communication unit 15 which receives, from the portable terminal 2, a connection history 241 with the other in-vehicle devices 1 which were previously connected to the portable terminal 2, and a license transfer management unit 114 which extracts an information terminal among the other information terminals that satisfies a license transfer condition based on the received connection history 241.

Because the in-vehicle device 1 extracts the information terminal that satisfies the license transfer condition based on the connection history of the portable terminal 2 and the in-vehicle device 1, the user is not required to input authentication information or the like, and the user's operation can be facilitated. In other words, a license can be transferred easily even when the device to which the license has been linked is inoperable. This is a result of taking note of the fact that, because the user carries around the portable terminal 2, the portable terminal 2 can be used as a means for identifying an individual, and the in-vehicle device 1 determines the possibility that the portable terminal 2 is the user's property based on the connection history of the portable terminal 2 and the in-vehicle device 1. The user is not required to input information regarding the in-vehicle device that was previously used by the user. Note that, while the method of having the user input one's ID and password may also be considered to demonstrate that the user is the owner of the license, not only will the input be complicated for the user, there is a problem in that the user's burden of storing or recording/managing the ID and password will be considerable.

(2) The license transfer condition determined by the license transfer management unit 114 includes a requisite condition that the number of times that the communication terminal and the other information terminal has been connected is a predetermined number of times or more. Even in cases where the user of the in-vehicle device 1 allows one's friend or acquaintance to board the vehicle 7 and connects the passenger's communication terminal to the in-vehicle device 1, the number of connections between such communication terminal and the in-vehicle device 1 will be relatively small. Meanwhile, it is assumed that the number of connections between the portable terminal 2, which is owned by the user of the in-vehicle device 1, and the in-vehicle device 1 will be great. Consequently, the license can be transferred to the owner of the in-vehicle device 1 of the license transfer source by evaluating the number of connections.

(3) The connection history 241 includes status information (transfer information) indicating whether license transfer processing is in progress, and the license transfer management unit 114 extracts an information terminal among the other information terminals in which the status information indicates that the license transfer processing is in progress. Consequently, even in cases where the license transfer processing is interrupted because the power of the in-vehicle device 1 is lost during the license transfer processing shown in step S363 to step S364 of FIG. 9 or any other reason, it is possible to properly resume the processing.

(4) The in-vehicle device 1 comprises an in-vehicle network communication unit (CAN interface 18A) connected to an in-vehicle network, and a connection management unit 113 which records the connection history with the corresponding information terminal in the communication terminal, wherein the connection management unit 113 records the connection history with the corresponding information terminal in the communication terminal at least on a condition that the in-vehicle network communication unit is connected to the in-vehicle network.

Consequently, in cases where the in-vehicle device 1 is placed in a store for demonstration, it is possible to prevent a visitor from recording a connection history by connecting the in-vehicle device 1 and the visitor's portable terminal 2. This is because the in-vehicle device 1 placed in a store is not connected to the CAN. It is thereby possible to prevent a license linked to the in-vehicle device 1 placed in a store from being transferred to the visitor's in-vehicle device 1.

(5) The in-vehicle device 1 comprises a transfer detection unit (encoder interface 18C) which detects a movement of the corresponding information terminal, and a connection management unit 113 which records the connection history with the corresponding information terminal in the communication terminal, wherein the connection management unit 113 records the connection history with the corresponding information terminal in the communication terminal at least on a condition that the transfer detection unit detects a movement of a predetermined amount or more.

Because the in-vehicle device 1 placed in a store is not connected to the rotary encoder 71, it is possible to prevent the recording of the connection history in the same manner as (4) above.

(6) The in-vehicle device 1 comprises an in-vehicle device storage unit 14 which stores position information of a registered location which is registered in advance, a position detection unit (GPS receiver interface 18B) which outputs a position of the corresponding information terminal; and a connection management unit 113 which records the connection history with the corresponding information terminal in the communication terminal, wherein the connection management unit 113 records the connection history with the corresponding information terminal in the communication terminal at least on a condition that the position output by the position detection unit is within a predetermined distance from the position of the registered location.

Because in-vehicle device 1 placed in a store does not move; it is possible to prevent the recording of the connection history in the same manner as (4) above. Moreover, when a person other than the user of the in-vehicle device 1 boards the vehicle at a location that is far from the registered location, even when the communication terminal owned by that person is connected to the in-vehicle device 1, it is possible to prevent a connection history from being recorded in that communication terminal. It is thereby possible to prevent a third party from wrongfully transferring a license linked to the in-vehicle device 1 to another in-vehicle device.

(7) The in-vehicle device 1 comprises a speed detection unit (encoder interface 18C) which detects a speed of the corresponding information terminal, and a connection management unit 113 which records the connection history with the corresponding information terminal in the portable terminal 2. The connection management unit 113 records the connection history with the corresponding information terminal in the portable terminal 2 at least on a condition that the speed detected by the speed detection unit is a predetermined speed or faster. The speed information of the vehicle 7 is readily available since it is used in various circumstances.

(8) The communication terminal (portable terminal 2) is connectable to each of a plurality of information terminals, and comprises a connection history storage unit (portable terminal storage unit 24) which stores a connection history with the plurality of information terminals, and an in-vehicle device connection history management unit 212 which reads the connection history from the connection history storage unit, and sends the connection history to a connected information terminal among the plurality of information terminals, wherein the in-vehicle device connection history management unit 212 stores the connection history with the connected information terminal in the connection history storage unit based on a command from the connected information terminal. Consequently, the portable terminal 2 records the connection history and sends the recorded connection history to the in-vehicle device 1.

(9) A license transfer system 9 is configured from an in-vehicle device 1, a portable terminal 2, and a server 3. The in-vehicle device 1 sends, to the server 3, a license transfer command for transferring a license from an information terminal which satisfies the license transfer condition to the corresponding information terminal. The server 3 comprises a server storage unit 34 which stores a license table indicating a relation between the information terminal and a software license, and a license management unit 312 which rewrites the license table based on the license transfer command from the information terminal.

Consequently, the license table 342 of the server 3 can be rewritten with a simple operation performed by the user based on the connection history of the in-vehicle device 1 and the portable terminal 2.

Modified Example 1

As shown in the flowchart of FIG. 8, the connection management unit 113 outputs a connection history recording command to the portable terminal 2 when, in addition to the condition of the in-vehicle device 1 being connected to the portable terminal 2, all of the following four conditions are satisfied; specifically, the in-vehicle device 1 is connected to the CAN network 73, the current position of the in-vehicle device 1 is within a predetermined distance from the registered location; the vehicle 7 has traveled a predetermined distance or more, and the vehicle speed of the vehicle 7 is a predetermined speed or faster. Nevertheless, the connection management unit 113 may also output a connection history recording command when at least one of the foregoing four conditions is satisfied, or output a connection history recording command only on the condition that the in-vehicle device 1 has been connected to the portable terminal 2.

Modified Example 2

In the first embodiment, the connection management unit 113 records the date that the connection history recording command was output in in-vehicle device storage unit 14, and outputs the connection history recording command when the recorded date and the current date are different in step S336 of FIG. 8. In other words, whether or not the recorded date and the current date are the same date was determined with 12:00 AM (time of date change) as the demarcation. Nevertheless, the time that the connection history recording command was output may also be recorded, and whether or not the recorded date and the current date are the same date may also be determined at a time other than 12:00 AM; for instance, at a time in the early morning when it is presumed that the vehicle will rarely be driven. Moreover, the lapse of a predetermined number of hours; for instance, 8 hours; 24 hours; or 48 hours; from the last time that the connection history recording command was output may also be used as the condition for outputting a connection history recording command in step S336 of FIG. 8.

Moreover, a connection history recording command may also be unconditionally output in step S336 of FIG. 8, and the license transfer management unit 114 may also make the same determination. In other words, the in-vehicle device connection history management unit 212 concurrently records the date and time, in which each connection history was recorded, in the connection history 241. Subsequently, the license transfer management unit 114 evaluates the number of connections based on the date and time of each connection history recorded in the connection history 241 received from the in-vehicle device connection history management unit 212. For instance, even if multiple connection histories are recorded in the same day, such multiple connection histories in that day are collectively evaluated as a single connection history.

Modified Example 3

In the first embodiment described above, one of the license transfer conditions determined by the license transfer management unit 114 was whether the number of connections is a predetermined number of times or more.

Nevertheless, the evaluation may be made not based on the absolute number, but based on the relative ratio, of the number of connections. In other words, the ratio of the number of connections of each in-vehicle relative to the sum of the number of connections of the respective in-vehicle devices recorded in the connection history 241 may be evaluated.

Modified Example 4

The in-vehicle network equipped in the vehicle 7 is not limited to CAN, and may also be LIN (Local Interconnect Network), MOST (Media Oriented System Transport), or FlexRay. The connection management unit 113 may determine whether the in-vehicle device 1 is connected to LIN or the like in substitute for the determination made in step S332 of FIG. 8.

Modified Example 5

The in-vehicle device 1 may internally comprise the GPS receiver 72. Moreover, in substitute for comprising the GPS receiver interface 18B, the in-vehicle device 1 may also acquire position information from the GPS receiver 72 via the CAN interface 18A. Moreover, in substitute for comprising the encoder interface 18C, the in-vehicle device 1 may receive the vehicle speed pulse signal from the rotary encoder 71 via the CAN interface 18A.

Modified Example 6

Either the date of license or the expiration date may be omitted from the license table 342. In other words, it will be sufficient for the license table 342 to store at least the in-vehicle device ID and information of the licensed application.

Modified Example 7

The functions equipped in the in-vehicle device 1 in the first embodiment may also be equipped in a device, such as a general-purpose computer, that is not installed in a vehicle. Moreover, the functions equipped in the portable terminal 2 may also be equipped in another device, such as a TCU (Telematics Communication Unit).

Modified Example 8

The in-vehicle device connection history management unit 212 may delete, from the connection history 241 to be sent to the in-vehicle device 1, information related to the corresponding in-vehicle device. For example, in cases where the connection history 241 stored in the portable terminal 2 is as shown in FIG. 4(a), upon receiving a connection history acquisition command from the in-vehicle device 1 having an in-vehicle device ID of "AAA", the line indicating that the in-vehicle device ID is "AAA" may be deleted from the connection history 241, and the connection history 241 with the foregoing line deleted therefrom may be sent.

Second Embodiment

The second embodiment of an in-vehicle device, which is an information terminal, is now explained with reference to FIG. 10 to FIG. 12. In the ensuing explanation, the same reference numeral is assigned to the same constituent element as the first embodiment, and differences will mainly be explained. Points that are not specifically explained are the same as the first embodiment. This embodiment mainly differs from the first embodiment with respect to the point that the connection history is stored in the server.

(Hardware Configuration)

The hardware configuration of the license transfer system 9A according to the second embodiment is the same as the first embodiment. However, the programs stored in the respective ROMs and the information stored in the respective storage units are different. The specific differences are now explained with reference to a functional block diagram.

(Functional Block)

Figure 10:
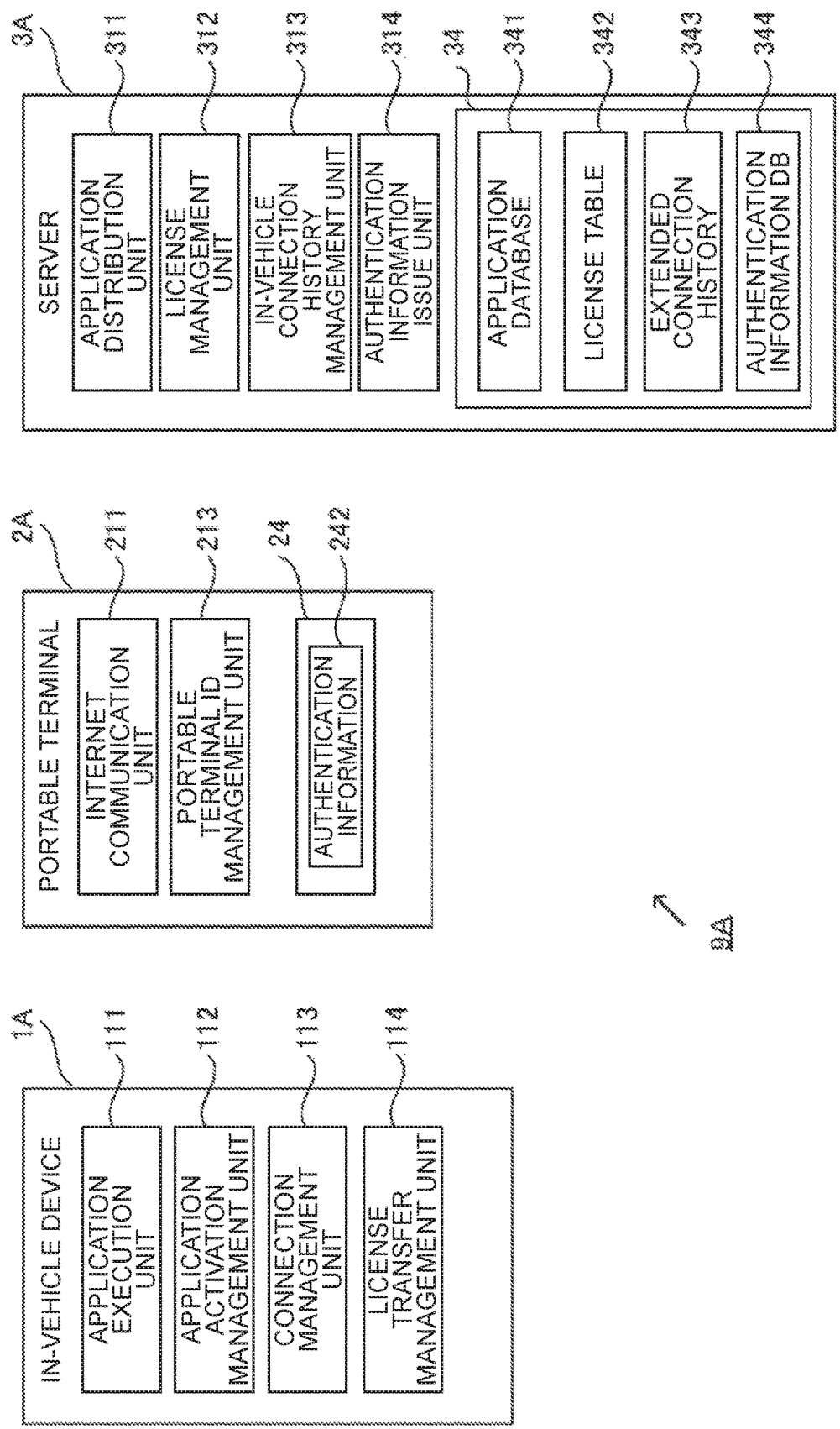
FIG. 10 is a functional block diagram of the license transfer system according to the second embodiment.

FIG. 10 is a functional block diagram of the license transfer system 9A according to the second embodiment. Because the functional blocks of the in-vehicle device 1A are the same as the first embodiment, the explanation thereof is omitted.

The portable terminal 2A comprises, as its logical configuration, an internet communication unit 211, and a portable terminal ID management unit 213. Moreover, the portable terminal storage unit 24 stores authentication information 242 which is used for the authentication of the server 3A. The internet communication unit 211 is the same as the first embodiment. The portable terminal ID management unit 213 relays the processing of the in-vehicle device 1A and the server 3A related to an extended connection history described later.

The server 3A comprises, as its logical configuration, an in-vehicle device connection history management unit 313 and an authentication information issue unit 314 in addition to the application distribution unit 311 and the license management unit 312. Moreover, the server storage unit 34 stores an extended connection history 343 and an authentication information database 344 in addition to the application database 341 and the license table 342. The operation of the application distribution unit 311 and the license management unit 312 is the same as the first embodiment. The in-vehicle device connection history management unit 313 corresponds to the in-vehicle device connection history management unit 212 of the portable terminal 2 in the first embodiment, and records the connection history in the extended connection history 343 and reads the connection history from the extended connection history 343 based on an operating command of the in-vehicle device 1. The authentication information issue unit 314 generates authentication information of the portable terminal 2A, and records the generated authentication information in the authentication information database 344. The extended connection history 343 stores, in addition to the information included in the connection history 241 in the first embodiment, combination information with the portable terminal 2. The authentication information database 344 stores information generated by the authentication information issue unit 314 which is also the authentication information of a plurality of portable terminals 2.

(Portable Terminal ID Management Unit)

When the portable terminal ID management unit 213 receives a connection history recording command from the in-vehicle device 1A, the portable terminal ID management unit 213 sends the connection history recording command to the server 3A, and, when the portable terminal ID management unit 213 receives a connection history acquisition command from the in-vehicle device 1A, the portable terminal ID management unit 213 sends the connection history acquisition command to the server 3A. However, the portable terminal ID and the password included in the authentication information 242 are added to the information to be sent to the server 3A.

(In-Vehicle Device Connection History Management Unit)

The difference between the in-vehicle device connection history management unit 313 and the in-vehicle device connection history management unit 212 of the portable terminal 2 in the first embodiment is the point that authentication using the authentication information database 344 is performed, and the point that the ID of the portable terminal 2 is also recorded. In other words, when the in-vehicle device connection history management unit 313 receives a connection history recording command including a portable terminal ID, a password, an in-vehicle device ID, and a recording command from the portable terminal 2A, the in-vehicle device connection history management unit 313 performs authentication by using the authentication information database 344 and the received portable terminal ID and password. When the authentication is successful, the in-vehicle device connection history management unit 313 increments by one the number of connections of the combination of the received portable terminal ID and the in-vehicle device ID in the extended connection history 343. Moreover, when the in-vehicle device connection history management unit 313 receives a connection history read command including a portable terminal ID, a password, an in-vehicle device ID, and a read command from the portable terminal 2A, the in-vehicle device connection history management unit 313 performs the foregoing authentication and, when the authentication is successful, reads the extended connection history 343 from the server storage unit 34 and sends the extended connection history 343 to the portable terminal 2A.

(Authentication Information Issue Unit)

When the authentication information issue unit 314 of the server 3 receives an authentication information issue request from the portable terminal 2A, the authentication information issue unit 314 newly generates a portable terminal ID and a password. Subsequently, the authentication information issue unit 314 sends the generated ID and password to the portable terminal 2 (request source), and additionally records the generated ID and password in the authentication information database 344. The authentication information issue unit 314 generates a different portable terminal ID each time that it receives an issue request.

(Extended Connection History)

The extended connection history 343 stored in the server 3 is, for example, a plurality of records that associate a portable terminal ID which identifies the portable terminal 2A, an in-vehicle device ID which identifies the in-vehicle device 1A, number of connections, and transfer status. The extended connection history 343 is read and written by the in-vehicle device connection history management unit 312.

Figure 11:
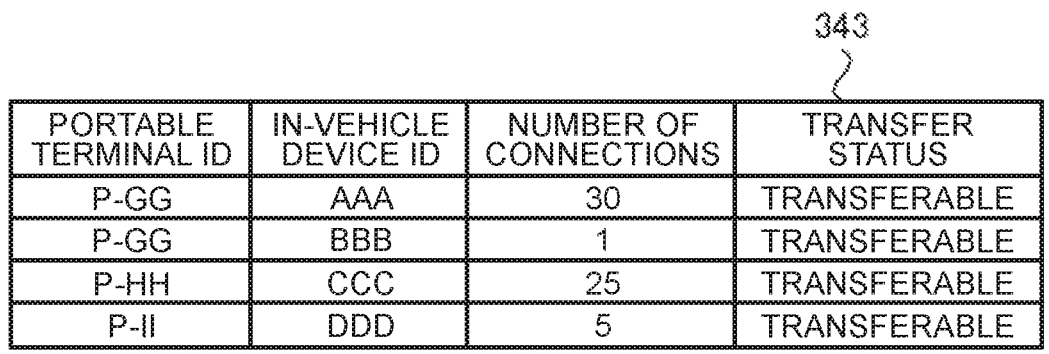
FIG. 11 is a diagram showing an example of the extended connection history.

FIG. 11 is a diagram showing an example of the extended connection history 343. The example illustrated in FIG. 11 shows the connection history of three portable terminal IDs (P-GG, P-HH, P-II) and four in-vehicle device IDs (AAA, BBB, CCC, DDD). The example illustrated in FIG. 11 shows that, for example, the in-vehicle device 1A having an in-vehicle device ID of "AAA" has been connected 30 times, and the in-vehicle device 1A having an in-vehicle device ID of "BBB" has been connected once, to the portable terminal 2 having a portable terminal ID of "P-GG".

(Flowchart)

Figure 12:
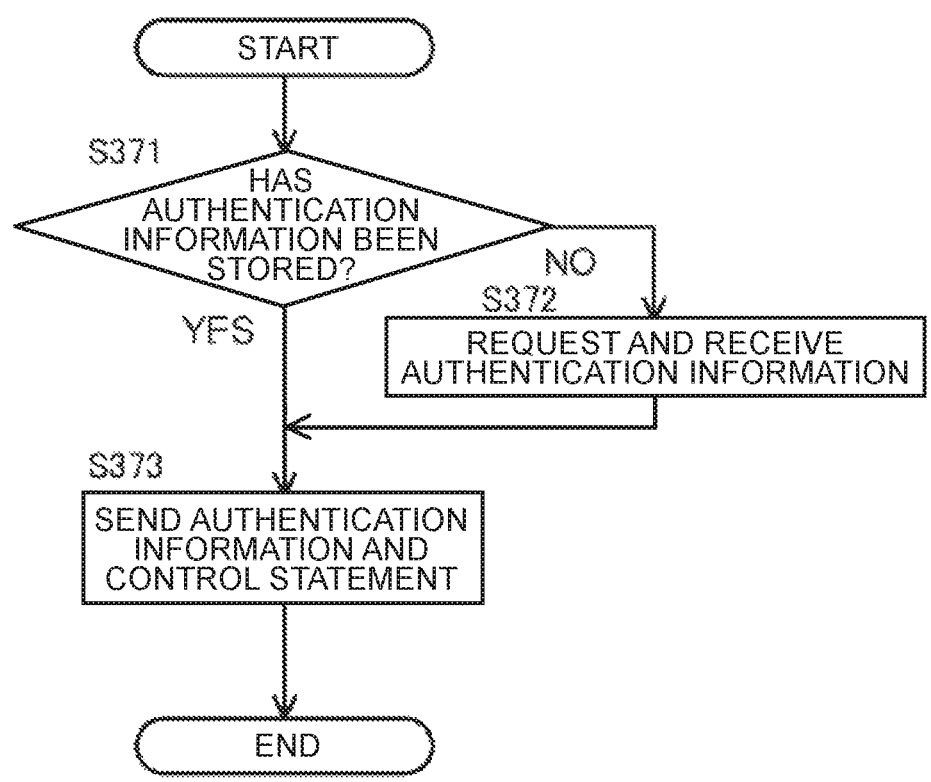
FIG. 12 is a flowchart showing an operation of the portable terminal ID management unit.

FIG. 12 is a flowchart showing an operation of the program that is executed when the portable terminal 2A receives a connection history acquisition command or a connection history recording command from the in-vehicle device 1A. The subject that executes the respective steps of the flowchart explained below is the CPU 21 of the portable terminal 2A. In this flowchart, the connection history acquisition command and the connection history recording command received from the in-vehicle device 1A are referred to as the "control statement".

In step S371, the CPU 21 of the portable terminal 2A determines whether the authentication information 242 is stored in the portable terminal storage unit 24. The CPU 21 proceeds to step S373 when it is determined that the authentication information 242 is stored in the portable terminal storage unit 24, and proceeds to step S372 when it is determined that the authentication information 242 is not stored in the portable terminal storage unit 24.

In step S372, the CPU 21 requests the server 3 to newly issue authentication information, and receives the authentication information from the server 3A. This authentication information is a portable terminal ID and a password. The CPU 21 stores these as the authentication information 242 in the portable terminal storage unit 24, and then proceeds to step S373.

In step S373, the CPU 21 sends the authentication information 242, and the control statement received from the in-vehicle device 1A, to the server 3A.

According to the second embodiment described above, the following effects are yielded.

(1) A server 3A is connected to a portable terminal 2A which is connectable to each of a plurality of in-vehicle devices 1A. The server 3A comprises a connection history storage unit (server storage unit 34) which stores an extended connection history 343 as a connection history of a plurality of information terminals and the communication terminal, and an in-vehicle device connection history management unit 313 which reads the connection history from the connection history storage unit and sends the connection history to the communication terminal. The in-vehicle device connection history management unit 313 stores the connection history of the communication terminal and the information terminal in the connection history storage unit based on a command from the communication terminal. Consequently, the server 3A can record the connection history and send the recorded connection history to the portable terminal 2A.

Modified Example 1 of Second Embodiment

As the portable terminal ID, used may be a value recorded in the ROM of the portable terminal 2A, or a value generated by the portable terminal 2A. Moreover, the generated value, which was generated by the portable terminal 2A, may be sent to the server 3A, and the portable terminal ID may be decided based on the generated value received by the authentication information issue unit 314 of the server 3A.

Modified Example 2 of Second Embodiment

The application database 341, the license table 342, and the extended connection history 343 may be respectively stored in different servers. For example, these may be stored in the first to third servers as follows. In other words, the first server comprises a first storage unit which stores the application database 341, and an application distribution unit 311.

The second server comprises a second storage unit which stores the license table 342, and a license management unit 312. The third server comprises a third storage unit which stores the extended connection history 343 and the authentication information database 344, an in-vehicle device connection history management unit 313, and an authentication information issue unit 314.

A part or all of the functions realized with the programs may also be realized with a hardware circuit or an FPGA.

Each of the foregoing embodiments and modified examples may be respectively combined.

While various embodiments and modified examples were described above, the present invention is not limited to the subject matter thereof. Other modes that are conceivable within the technical scope of the present invention are also covered by the present invention.

The disclosure of the following priority application is incorporated herein by reference.

Japanese Patent Application No. 097797 of 2016 (filed on May 16, 2016)

REFERENCE SIGNS LIST 1, 1A . . . in-vehicle device
2, 2A . . . portable terminal
3, 3A . . . server
9 . . . license transfer system
14 . . . in-vehicle device storage unit
15 . . . in-vehicle device communication unit
18A . . . CAN interface
18B . . . GPS receiver interface
18C . . . encoder interface
24 . . . portable terminal storage unit
25 . . . portable terminal communication unit
34 . . . server storage unit
113 . . . connection management unit
114 . . . license transfer management unit
212 . . . in-vehicle device connection history management unit
213 . . . portable terminal ID management unit
241 . . . connection history
312 . . . license management unit
313 . . . in-vehicle device connection history management unit
342 . . . license table
343 . . . extended connection history

The invention claimed is:

1. An information terminal for transferring a license to use a digital content connected to a communication terminal which is connectable to one or more other information terminals via a wireless communication network, comprising:
   a first storage medium for storing a data structure comprising of a plurality of records including a number of connections previously made from the communication terminal to said other information terminals and status information indicating whether a license transfer processing is in progress, as a connection history data structure;
   a communication unit which receives, from the first storage medium, the connection history data structure;
   a second storage medium for storing a data structure including a predetermined number of times that the communication terminal and the other information terminal were connected, as a license transfer condition data structure; and a license transfer management unit which accesses the first storage medium and the second storage medium and identifies a licensed information terminal among the other information terminals for which the license transfer condition is equal to or greater than the predetermined number of times stored in the second storage medium, according to the received connection history data structure stored in the first storage medium, wherein the information terminal transfers, via the wireless communication network, a valid license from the licensed information terminal to the information terminal.

2. The information terminal according to claim 1, wherein the license transfer management unit also identifies the licensed information terminal among the other information terminals in which the status information indicates that the license transfer processing is in progress.

3. The information terminal according to claim 1, further comprising: an in-vehicle network communication unit connected to an in-vehicle network; and a connection management unit which records the connection history with a corresponding information terminal in the communication terminal, wherein the connection management unit records the connection history with the corresponding information terminal in the communication terminal at least based on a condition that the in-vehicle network communication unit is connected to the in-vehicle network.

4. The information terminal according to claim 1, further comprising: a transfer detection unit which detects a movement of a corresponding information terminal; and a connection management unit which records the connection history with the corresponding information terminal in the communication terminal, wherein the connection management unit records the connection history with the corresponding information terminal in the communication terminal at least on a condition that the transfer detection unit detects a movement of a predetermined amount or more.

5. The information terminal according to claim 1, further comprising: a storage unit which stores position information of a registered location which is registered in advance; a position detection unit which detects a position of a corresponding information terminal; and a connection management unit which records the connection history with the corresponding information terminal in the communication terminal, wherein the connection management unit records the connection history with the corresponding information terminal in the communication terminal at least on a condition that the position detected by the position detection unit is within a predetermined distance from the position of the registered location.

6. The information terminal according to claim 1, further comprising: a speed detection unit which detects a speed of a corresponding information terminal; and a connection management unit which records the connection history with the corresponding information terminal in the communication terminal, wherein the connection management unit records the connection history with the corresponding information terminal in the communication terminal at least on a condition that the speed detected by the speed detection unit is a predetermined speed or faster.

7. A system transferring a license to use a digital content and configured from an information terminal, a communication terminal, and a server, wherein the information terminal is connected to a communication terminal which is connectable to one or more other information terminals, and comprises:

an information terminal communication unit which receives, from the communication terminal, a connection history data structure with the other information terminals which were previously connected to the communication terminal, wherein the connection history data structure comprises of a plurality of records including a number of connections previously made from the communication terminal to said other information terminals and status information indicating whether a license transfer processing is in progress; and a license transfer management unit which identifies an information terminal among the other information terminals that satisfies a license transfer condition based on the received connection history data structure, wherein the information terminal communication unit sends, to the server, a license transfer command for transferring a license from an information terminal which satisfies the license transfer condition to a corresponding information terminal, wherein the communication terminal comprises: a connection history storage unit which stores the connection history data structure with the plurality of information terminals; and an in-vehicle device connection history management unit which reads the connection history data structure from the connection history storage unit, and sends the connection history data structure to a connected information terminal among the plurality of information terminals, wherein the in-vehicle device connection history management unit stores the connection history data structure with the connected information terminal in the connection history storage unit based on a command from the connected information terminal, and wherein the server comprises: a server storage unit which stores a license data structure indicating a relation between the information terminal and a software license; and a license management unit which rewrites the license data structure based on the license transfer command from the information terminal.

8. A method for transferring a license to use a digital content and executed in an information terminal, a communication terminal, and a server, wherein the information terminal is connected to a communication terminal which is connectable to one or more other information terminals, wherein the information terminal;

receives, from the communication terminal, a connection history data structure with the one or more other information terminals which were previously connected to the communication terminal;

identifies a licensed information terminal among the one or more other information terminals that satisfies a license transfer condition based on the received connection history data structure, wherein the connection history data structure comprises of a plurality of records including a number of connections previously made from the communication terminal to said other information terminals and status information indicating whether a license transfer processing is in progress; and sends, to the server, a license transfer command for transferring a license from the licensed information terminal which satisfies the license transfer condition to a corresponding information terminal, wherein the communication terminal comprises a connection history storage unit which stores the connection history data structure with the one or more other information terminals, wherein the communication terminal: reads the connection history data structure from the connection history storage unit, and sends the connection history data structure to a connected information terminal among the one or more other information terminals; and stores the connection history data structure with the connected information terminal in the connection history storage unit based on a command from the connected information terminal, and wherein the server comprises a server storage unit which stores a license data structure indicating a relation between the licensed information terminal and a software license; and wherein the server rewrites the license data structure based on the command from the connected information terminal.

* * * * *